US009788127B2

(12) United States Patent
Giese et al.

(10) Patent No.: US 9,788,127 B2
(45) Date of Patent: Oct. 10, 2017

(54) METHOD AND DEVICE FOR THE IMPROVED PERCEPTION OF ONE'S OWN VOICE

(71) Applicant: SIVANTOS PTE. LTD., Singapore (SG)

(72) Inventors: Ulrich Giese, Fuerth (DE); Sebastian Pape, Erlangen (DE); Marko Lugger, Erlangen (DE); Homayoun Kamkar Parsi, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 14/838,621

(22) Filed: Aug. 28, 2015

(65) Prior Publication Data

US 2016/0066102 A1 Mar. 3, 2016

(30) Foreign Application Priority Data

Aug. 28, 2014 (DE) ........................ 10 2014 217 172

(51) Int. Cl.
*H04R 25/00* (2006.01)
*G10L 15/00* (2013.01)

(52) U.S. Cl.
CPC ........... *H04R 25/505* (2013.01); *H04R 25/43* (2013.01); *H04R 2225/43* (2013.01); *H04R 2460/01* (2013.01); *H04R 2460/05* (2013.01)

(58) Field of Classification Search
CPC ............................ H04R 2225/43; G10L 21/02
USPC .......... 381/317, 312, 320–322, 331; 704/233
See application file for complete search history.

(56) References Cited

U.S. PATENT DOCUMENTS 7,031,484 B2 * 4/2006 Ludvigsen ............. H04R 25/70 381/312
7,853,031 B2 * 12/2010 Hamacher ............ H04R 25/453 381/312
8,224,002 B2 7/2012 Kornagel
8,873,779 B2 10/2014 Lugger
8,885,838 B2 11/2014 Paludan-Muller et al.
2003/0161485 A1 8/2003 Smith
2012/0082330 A1 4/2012 Kornagel et al.
2013/0148829 A1 * 6/2013 Lugger .................. H04R 25/00 381/312

FOREIGN PATENT DOCUMENTS

DE 102005032274 A1 1/2007
DE 102011087984 A1 6/2013
EP 1744589 A2 1/2007
EP 1906701 A2 4/2008
EP 2437394 A1 4/2012
WO 2011069504 A1 6/2011

* cited by examiner

*Primary Examiner* — Sunita Joshi
(74) *Attorney, Agent, or Firm* — Laurence A. Greenberg; Werner H. Stemer; Ralph E. Locher

(57) ABSTRACT

A hearing aid device and a method for operating the hearing aid device. The hearing aid device has an acousto-electrical transducer, a signal processing unit, an electro-acoustic transducer and a unit for recognizing a wearer's own voice. The hearing aid device detects and recognizes the wearer's own voice by way of the recognition unit and, when the wearer's own voice has been detected, operates the signal processing unit with a modified signal processing parameter that is modified such that the sound of the wearer's own voice is improved.

10 Claims, 1 Drawing Sheet

METHOD AND DEVICE FOR THE IMPROVED PERCEPTION OF ONE'S OWN VOICE

CROSS-REFERENCE TO RELATED APPLICATION

This application claims the priority, under 35 U.S.C. §119, of German patent application DE 10 2014 217 172.5, filed Aug. 28, 2014; the prior application is herewith incorporated by reference in its entirety.

BACKGROUND OF THE INVENTION

Field of the Invention

The invention relates to a hearing aid device which has an acousto-electrical transducer, a signal processing device, an electro-acoustic transducer and a device for rapidly detecting a wearer's own voice. The invention further relates to method for operating the hearing aid device.

Hearing aid devices are wearable hearing devices which are used to support those hard of hearing. In order to meet the numerous individual requirements, different designs of hearing aid devices such as behind-the-ear hearing devices (BTE), receiver in the canal (RIC) and in-the-ear hearing devices (ITE), e.g. also concha hearing devices or in-the-ear and in-the-canal (ITE, CIC) hearing devices are provided. The hearing devices listed by way of example are worn on the outer ear or in the ear canal. In addition, bone conduction hearing aids, implantable or vibrotactile hearing aids are also available on the market. In this context, the damaged hearing is stimulated either mechanically or electrically.

In principle, hearing aid devices have as essential components an input transducer, an amplifier and an output transducer. As a rule, the input transducer is an acousto-electrical transducer, such as a microphone, and/or a electromagnetic receiver, such as an induction coil. The output transducer is mostly implemented as electro acoustic transducer, such as a miniature loudspeaker, or as electromechanical transducer, such as a bone conduction receiver. The amplifier is usually integrated into a signal processing unit or signal processing device. Electrical energy is usually supplied by a battery or a rechargeable battery.

On the one hand, hearing aid devices, or their ear shells, respectively, close the ear canal wholly or partially, on the other hand, hearing aid devices preferably pick up airborne sound via the microphone whereas solid-borne sound is suppressed if possible. However, the wearer's voice is perceived differently, especially due to the solid-borne sound, than from the environment.

For a hearing device wearer, the fact that especially the airborne sound is amplified, results in a changed and unfamiliar perception of the wearer's own voice. In addition, the closure of the ear canal by the hearing aid device leads to an effect which is called occlusion and also alienates the perception.

Commonly assigned U.S. Pat. No. 8,873,779 B2 and its counterpart German published patent application DE 10 2011 087 984 A1 describe a method for recognizing the wearer's own voice for a hearing aid device.

SUMMARY OF THE INVENTION

It is an object of the invention to provide a method and device for the improved recognition of a wearer's voice which overcomes a variety of disadvantages of the heretofore-known devices and methods of this general type and which provide for a hearing aid device and a method for operating the hearing aid device which offers a better hearing experience of the wearer's own voice to the wearer.

With the foregoing and other objects in view there is provided, in accordance with the invention, a hearing aid device, comprising:

an acousto-electrical transducer, a signal processing unit connected to the acousto-electrical transducer, and an electro-acoustic transducer connected to the signal processing unit;

a recognition unit for quickly recognizing a hearing aid wearer's own voice;

the hearing aid device being configured to recognize the wearer's own voice by way of the recognition unit and, when the wearer's own voice has been recognized, to operate the signal processor with a modified signal processing parameter that is modified in such a manner that a sound perception of the wearer's own voice is improved;

the hearing aid device being configured to operate the signal processing unit in parallel on a first signal processing path with the modified signal processing parameter and on a second signal processing path with a second value for the signal processing parameter; and the signal processing unit being configured to mix a signal, to be supplied to the electro-acoustic transducer, from an output signal of the first signal path and an output signal of the second signal path, in dependence on recognizing the wearer's own voice.

In other words, the hearing aid device according to the invention has an acousto-electrical transducer, a signal processing unit or facility, an electro-acoustic transducer and a recognition unit for recognizing the wearer's own voice. The hearing aid device is designed to quickly recognize the wearer's own voice by means of the recognition unit and, when the wearer's own voice has been recognized, to operate the signal processing unit with a signal processing parameter modified in such a manner that the sound of the wearer's own voice is improved. In this context, the modified adjustment of the signal processing parameter becomes promptly effective, i.e. only delayed by an implementation of the change in the signal processing unit, that is to say within 1 ms, 10 ms or 50 ms at the most.

In this context, the recognition unit can be the signal processing unit, but it can also be a separate unit of the hearing aid device. Recognizing the wearer's own voice is possible, for example, by means of a direction of the sound or due to a symmetry in the case of a binaural hearing aid device with a data exchange to a second hearing aid device on another side of the head. The recognition unit can also have a structure-borne sound microphone so that the wearer's voice is recognized by means of the proportion transferred through the skull bones. Different options of improving the sound of the wearer's own voice by means of the signal processing parameter are specified in the dependent claims.

The hearing aid device advantageously changes a signal processing parameter when the wearer's own voice is recognized. Thus, the sound can be adapted and optimized for this special case in which the wearer's own voice dominates without worsening the sound in other hearing situations.

The method according to the invention shares the advantages of the hearing aid device according to the invention. There is, therefore, provided, in accordance with the invention, a method of improving a perception of a wearer's own voice in a hearing aid device, the method comprising:

detecting the presence of the wearer's own voice by way of the recognition unit within a period of a single sound;

when the wearer's own voice is detected, modifying a signal processing parameter to improve the sound of the wearer's own voice in the electro-acoustic transducer, by:

performing signal processing by the signal processing unit in parallel on a first signal processing path with the modified signal processing parameter and on a second signal processing path with a second value for the signal processing parameter; and mixing a signal present at the electro-acoustic transducer from an output signal for the first signal path and an output signal of the second signal path by the signal processing unit in dependence on whether or not the wearer's own voice has been recognized.

Other features which are considered as characteristic for the invention are set forth in the appended claims.

In accordance with an added feature of the invention, the unit for recognizing the wearer's own voice is designed to recognize the wearer's own voice within the period of a single sound. This is possible, for example, by means of the methods specified hereinbefore or a combination thereof.

Thus, it is advantageously possible that the hearing aid device according to the invention adapts its signal parameters, and thus the sound of the wearer's own voice, before the wearer becomes conscious of the changed sound.

In accordance with an additional feature of the invention, the device has a facility for automatic gain control. In this context, the modified signal processing parameter is a signal processing parameter of the automatic gain control. The signal processing parameter is from a group composed of gain, compression factor, knee of a compression curve or time constant.

Because of the vicinity to the ear and the additional transmission by bone conduction, the wearer's own voice will always be perceived more loudly. The hearing aid device according to the invention therefore matches the gain, the compression and/or also time constants to this increased loudness and the familiar perception.

In accordance with another feature of the invention, the device has a facility for interference noise suppression. In this context, the modified signal processing parameter specifies an intensity of interference noise suppression.

In the case of his own voice, the wearer of the hearing aid device is not dependent on setting it apart from environmental noises since he knows his own utterances. The hearing aid device can, therefore, dispense with the interference noise suppression when the wearer is speaking, or reduce it and thus advantageously avoid interfering artifacts.

In accordance with a further feature of the invention, the device has a facility for active occlusion suppression. In this context, the modified signal processing parameter, on recognizing the wearer's own voice, provides an intensity of an active occlusion suppression.

The occlusion has an unpleasant effect especially in the case of the wearer's own voice. The hearing aid device according to the invention is advantageously able to recognize this situation and to reduce a disturbance by the occlusion.

In accordance with again an added feature of the invention, the modified signal processing parameter influences a characteristic of the acousto-electrical transducer.

For example, it is conceivable that the microphone is switched to an omnidirectional characteristic so that the wearer of the hearing aid device perceives all collocutors in his environment and the wearer's own voice is advantageously not emphasized further.

According to the invention, the hearing aid device is designed to operate the signal processing unit in parallel on a first signal processing path with the modified signal processing parameter and on a second signal processing path with a second value for the signal processing parameter. In other words, acoustic signals are processed in parallel in two different ways so that subsequently two output signals having different characteristics are available. The signal processing unit is also designed to mix a signal, present at the electro-acoustic transducer, from an output signal of the first signal path and an output signal of the second signal path, in dependence on recognizing the wearer's own voice.

The hearing aid device according to the invention can provide, by means of the processing, acoustic signals from different algorithms even if the modified signal processing parameter, for example, changes not only the processing within an algorithm but causes another algorithm to be executed. Even in this case, a smooth transition or arbitrary intermediate values can be provided due to the mixing of the two output signals.

In accordance with again an additional feature of the invention, recognizing the wearer's own voice is represented by a binary value. In this context, the signal processing unit is designed to cross-fade the signal present at the electro-acoustic transducer between the output signal of the the first signal path and the output signal of the second signal path in dependence on the binary value.

The hearing aid device according to the invention can also advantageously provide a smooth and more pleasant transition for the wearer in the hearing device settings if the actual recognition of the wearer's own voice represents a binary process with a hard transition.

In accordance with again a further feature of the invention, the device is designed to carry out signal processing in a plurality of disjoint or only partially overlapping frequency bands, wherein the modified signal processing parameter is used only in a subset of the plurality of frequency bands.

Since the signal processing occurs in a number of disjoint frequency bands, it is possible to change to signal processing parameters on detection of the wearer's own voice only in frequency bands in which the sound of the wearer's own voice has to be adapted, for example at low frequencies. The sound characteristic can therefore advantageously be adapted better and resources can also be saved in the signal processing depending on architecture.

In accordance with yet an added feature of the invention, the recognition unit for recognizing the wearer's own voice is designed to recognize the wearer's voice in one of the multiplicity of frequency bands and to operate the signal processing unit in this one of the multiplicity of frequency bands with a signal processing parameter modified in such a manner that the sound of the wearer's own voice is improved.

It is also conceivable that the wearer's voice is recognized only in individual ones of the multiplicity of frequency bands, for example because the wearer's voice has spectral components only in individual frequency bands. In other frequency bands, the sound can then remain advantageously unchanged so that the wearer is irritated less by adjustment changes.

In accordance with yet an additional feature of the invention, the device is designed to change the modified signal processing parameter again to another value when the recognition unit for recognizing the wearer's own voice no longer recognizes the wearer's own voice.

Thus, the hearing aid device according to the invention can resume the old hearing setting or another one again as soon as the wearer stops speaking. Since the wearer's voice covers other perceptions, the wearer will advantageously not notice the changes in settings during his speaking because the hearing aid device resumes suitable hearing settings for the situation without the wearer's own voice again before and afterwards.

Although the invention is illustrated and described herein as embodied in a method and a device for the improved perception of one's own voice, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
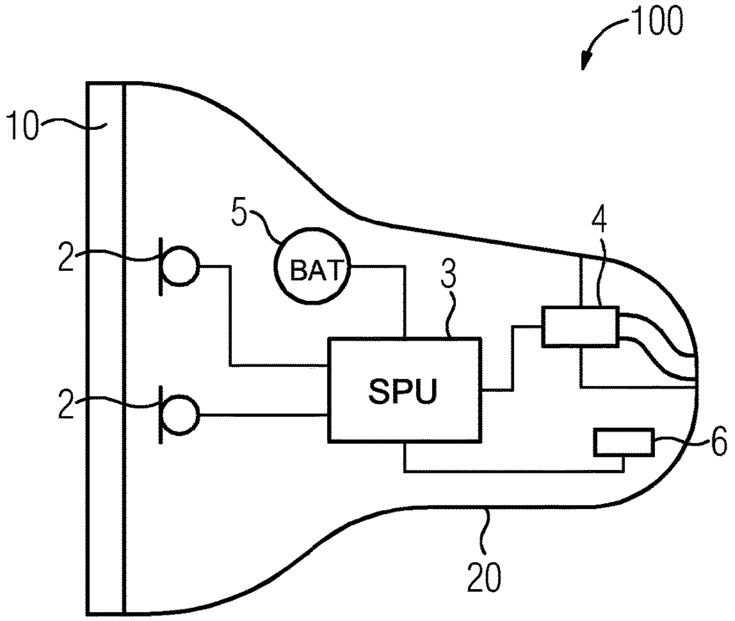
FIG. 1 shows an exemplary diagrammatic representation of a hearing aid device according to the invention.

Referring now to the figures of the drawing in detail and first, particularly, to FIG. 1 thereof, there is shown the basic structure of a hearing aid device 100 according to the invention. One or more microphones, also called acousto-electrical transducers 2, are installed in a hearing aid device housing 10, 20. The microphones pick up the sound or acoustic signals from the environment. The hearing aid device can be in principle a behind-the-ear (BTE) or in-the-ear (ITE) device. The microphones 2 are acousto-electrical transducers 2 for converting the sound into first electrical audio signals. A signal processing unit or signal processing unit (SPU) 3 which is also arranged in the hearing aid device housing 10, 20 processes the first audio signals. The output signal of the signal processing unit 3 is transferred to a loudspeaker or receiver 4 which outputs an acoustic signal. In the case of an HdO hearing aid device, the sound is transferred, if necessary, via an acoustic tube which is fixed by means of otoplasty in the ear canal, to the eardrum of the wearer of the device. However, another electro-mechanical transducer is also conceivable such as, for example, a bone conduction receiver. The hearing aid device 100 and particularly the signal processing unit 3 are supplied with energy by a battery 5, which is also integrated into the hearing aid device housing 10, 20.

The hearing aid device 100 also has a facility 6 for recognizing the wearer's own voice. The facility 6 for recognizing the wearer's own voice can be designed as separate unit and for this purpose can obtain first audio signals of one or more acousto-electrical transducers 2 via a signal link from the signal processing unit 3. It could also be designed as a separate unit outside the hearing aid device 100 and have a wire-connected or wireless signal link to the latter, the hearing aid device 100 and the facility 6 having corresponding transmission facilities in this case.

In a preferred embodiment of the hearing aid device according to the invention, the facility 6 for recognizing the wearer's own voice is implemented in the signal processing unit 3, however, as a separate circuit or also in the form of executed program instructions.

In a preferred embodiment of the hearing aid device 100 according to the invention, the facility 6 for recognizing the wearer's own voice is able to recognize the voice within a short time, that is to say within the period of a single sound or even more quickly, for example within less than 100 ms or 50 ms. This is only possible if the hearing aid device utilizes characteristics of the voice which are particularly rapidly recognizable.

For example, it is possible that the hearing aid device 100 has an acousto-electrical transducer 2 which is arranged in the hearing aid device in such a manner that it preferably picks up solid-borne sound from a wall of the ear canal, for example is arranged in the wall of the housing 20 or in direct contact therewith. If sound energy occurs here with predetermined minimum amplitude within a predetermined frequency range, this is with a high probability the wearer's voice which is recognized quickly in this manner.

It is also conceivable that the direction of the sound source or a symmetry is utilized. Thus, a direction can be determined by means of a number of acousto-electrical transducers 2 from which it is concluded that it is the wearer's voice when the direction corresponds to a predetermined direction and exceeds a predetermined minimum amplitude.

It is also possible that the hearing aid device 100 is part of a binaural hearing aid device system. It then has a communication facility in order to receive an audio signal via a signal link with another hearing aid device 100 of the system. The wearer's own voice can also be recognized quickly by finding a predetermined similarity or correlation of an audio signal from an acousto-electrical transducer 2 and the received audio signal and simultaneous transgression of a predetermined minimum amplitude.

Other methods for quickly recognizing the wearer's own voice and also logical combinations of said or corresponding methods are also conceivable.

The hearing aid device 100 is also designed to operate in the signal processing unit 3 with a signal processing parameter modified in such a manner that the sound of the wearer's own voice is improved.

On recognizing the wearer's own voice, the signal processing unit 3 can load and use a changed set of parameters into registers in the processing of the audio signals. If the facility 6 is designed for recognizing the wearer's own voice separately, it can signal a corresponding change to the signal processing unit 3 via the signal link or convey a set of parameters.

An improvement can be achieved, for example, in that the hearing aid device according to the invention has in the signal processor a facility for automatic gain control. To improve the sound sensation, it is then possible to change or reduce, for example, a gain, a compression factor as change parameter, to move a knee in a compression curve or to enlarge or change a time constant for a control rate.

The change is implemented immediately following the recognition of the wearer's own voice within maximally 1 ms, 10 ms or 50 ms. The delay can occur mainly due to the fact that a change in a filter setting only becomes effective when several samples have passed through the filter while a change in the gain becomes effective within the time of a sample passing through the signal processor.

If the hearing aid device has a facility for the suppression of interference noise, it is also conceivable, for the improvement of the sound, to change as signal processing parameter its intensity, for example to reduce it, in order to avoid artifacts due to the wearer's own voice.

It is also possible that the hearing aid device has a facility for active occlusion suppression. An occlusion is particularly unpleasant when the wearer himself is speaking. To improve this, the hearing aid device can increase the intensity of the occlusion suppression as changed signal processing parameter, for example, in this case.

In one conceivable embodiment of the hearing aid device according to the invention, a characteristic of the acousto-electrical transducer 2 can be influenced as a modified signal processing parameter. For example, an omnidirectional sensitivity can be set.

It is also conceivable that the hearing aid device 100 is designed to operate the signal processing unit 3 in parallel on a first signal processing path with the modified signal processing parameter and on the second signal processing path with a second value for the signal processing parameter. For example, the signal processing unit 3 can process the audio signals of the acousto-electrical transducers in parallel with two processes or in two channels, in each case with different parameter settings or programs. The signal processing unit 3 is then able, by means of a mixer or a corresponding algorithm, to add the result of the signal processing paths weighted with a mixing parameter or mix it in another manner. Thus, a smooth transition can be executed on recognizing the wearer's own voice, which irritates the wearer less.

In particular when the recognition is implemented not as a softer value in the sense of a fuzzy logic but is specified by a binary value, it is possible that by means of a mixing parameter changing with time, gentle cross-fading can be achieved between a first hearing situation and a hearing situation or hearing setting optimized for the wearer's own voice.

The hearing aid device 100 is preferably designed to carry out signal processing in a multiplicity of disjoint or only partially overlapping frequency bands, wherein the modified signal processing parameter is used only in a subset of the multiplicity of frequency bands. For a frequency-dependent adaptation of the gain, hearing aid devices usually divide the audio signal or signals of the acousto-electrical transducers 2 in the signal processor 3, e.g., by means of a filter bank or an FFT, into a multiplicity of disjoint or only partially overlapping frequency bands. The wearer's own voice is normally perceived by the solid-borne sound transmission mainly in lower frequency ranges so that it is sufficient if a signal processing parameter is adapted only in some of the multiplicity of frequency bands in order to improve the sound of the wearer's own voice.

In this context, it is also conceivable that the facility 6 for recognizing the wearer's own voice is only executed on one or some of the frequency bands in order to recognize the wearer's own voice. Thus, for example, the computing load can be reduced or the reliability of the recognition can be increased.

Finally, the hearing aid device according to the invention is designed, in the case that the wearer's own voice is no longer recognized, to return back into the previous hearing program or to set a hearing program adapted to another situation. In this context, it is conceivable that, in the case of a facility for quickly recognizing, the change also occurs again quickly, for example 50 ms or 100 ms at the most, that is to say the hearing aid device is designed to switch over quickly in the case of a change of words and then to provide both a pleasant sound of the wearer's own voice and to provide for an undisturbed perception of the voice of the other speaker in a conversation, i.e., the collocutor.

Figure 2:
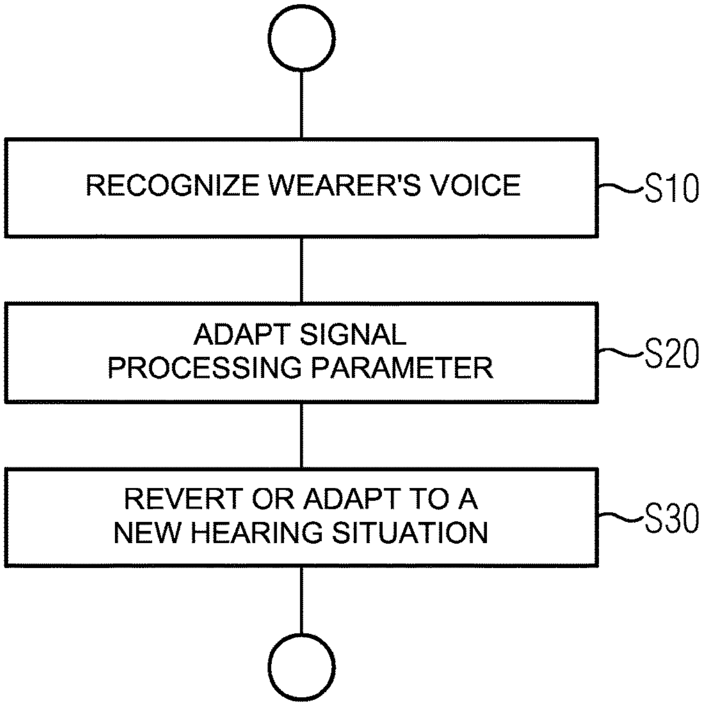
FIG. 2 shows a diagrammatic flowchart of an embodiment of the method according to the invention.

FIG. 2 represents a diagrammatic flowchart of one embodiment of the method according to the invention.

In a step S10, the wearer's own voice is recognized within the period of a single sound by way of the facility 6. That is, the term "quickly," in this context is intended to mean within the period of a single sound or within 1 ms, 10 ms or no more than 50 ms.

In a step S20, one or more signal processing parameters are changed by the hearing aid device 100 or the facility 6 or the signal processing unit 3 when the wearer's own voice has been recognized, in such a manner that the sound of the wearer's own voice is improved. The various possibilities for the method for sound improvement have already been explained in the preceding discussion relating to the hearing aid device 100.

In a conceivable step S30, one or more signal processing parameters are changed again by the hearing aid device 100 or the facility 6 or the signal processing unit 3 when the wearer's own voice is no longer recognized, so that an original hearing setting is established again or a changed hearing setting is set for a new hearing situation.

Although the invention has been illustrated and described in greater detail by the preferred exemplary embodiment, the invention is not restricted by the examples disclosed and other variations can be derived by the expert without departing from the scope of the invention.

The invention claimed is:

1. A hearing aid device, comprising:

an acousto-electrical transducer, a signal processing unit connected to said acousto-electrical transducer, and an electro-acoustic transducer connected to said signal processing unit;

a recognition unit for quickly recognizing a hearing aid wearer's own voice;

the hearing aid device being configured to recognize the wearer's own voice by way of said recognition unit and, when the wearer's own voice has been recognized, to operate said signal processing unit with a modified signal processing parameter, provided to influence a characteristic of the acousto-electrical transducer, that is modified in order to improve a sound perception of the wearer's own voice;

said hearing aid device being configured to operate said signal processing unit in parallel on a first signal processing path with the modified signal processing parameter and on a second signal processing path with a second value for the signal processing parameter; and said signal processing unit being configured to mix a signal, to be supplied to said electro-acoustic transducer, from an output signal of the first signal path and an output signal of the second signal path, in dependence on recognizing the wearer's own voice;

wherein said recognition unit recognizing the wearer's own voice is represented by a binary value and the signal processing unit is configured to cross-fade an input signal of the electro-acoustic transducer between an output signal of the first signal processing path and an output signal of the second signal processing path in dependence on the binary value.

2. The hearing aid device according to claim 1, wherein said recognition unit for recognizing the wearer's own voice is configured to recognize the wearer's own voice within a period of a single sound.

3. The hearing aid device according to claim 1, which further comprises a unit for automatic gain control, and wherein the modified signal processing parameter is a signal processing parameter of the automatic gain control selected from the group consisting of gain, compression factor, knee of a compression curve and time constant.

4. The hearing aid device according to claim 1, which further comprises a unit for interference noise suppression, and wherein the modified signal processing parameter specifies an intensity of an interference noise suppression.

5. The hearing aid device according to claim 1, which further comprises a unit for active occlusion suppression, and wherein the modified signal processing parameter specifies an intensity of an active occlusion suppression.

6. The hearing aid device according to claim 1, wherein the hearing aid device is configured to carry out signal processing in a multiplicity of disjoint or only partially overlapping frequency bands, and wherein the modified signal processing parameter is used only in a subset of the multiplicity of frequency bands.

7. The hearing aid device according to claim 6, wherein said recognition unit for recognizing the wearer's own voice is configured to recognize the wearer's voice in one of the multiplicity of frequency bands and to cause said signal processing unit to operate in the one frequency band with a signal processing parameter modified so as to improve the sound of the wearer's own voice.

8. The hearing aid device according to claim 1, wherein said signal processing unit is configured to change the modified signal processing parameter to another value when said recognition unit for recognizing the wearer's own voice no longer recognizes the wearer's own voice.

9. A method of improving a perception of a wearer's own voice on a hearing aid device, the hearing aid device having an acousto-electrical transducer, a signal processor, an electro-acoustic transducer, and a recognition unit for recognizing a wearer's own voice, the method comprising:

recognizing the wearer's own voice by way of the recognition unit within a period of a single sound;

when the wearer's own voice is detected, modifying a signal processing parameter to improve the sound of the wearer's own voice in the electro-acoustic transducer;

performing signal processing by the signal processing unit in parallel on a first signal processing path with the modified signal processing parameter and on a second signal processing path with a second value for the signal processing parameter; and mixing a signal present at the electro-acoustic transducer from an output signal for the first signal path and an output signal of the second signal path by the signal processing unit in dependence on whether or not the wearer's own voice has been recognized;

wherein recognizing the wearer's own voice is represented by a binary value and the signal processing unit cross-fades the signal present at the electro-acoustic transducer between the output signal of the first signal path and the output signal of the second signal path in dependence on the binary value.

10. The method according to claim 9, which comprises carrying out signal processing in a multiplicity of disjoint or only partially overlapping frequency bands, and using the modified signal processing parameter only in a subset of the multiplicity of frequency bands.

* * * * *